| (12) | United States Patent | (10) Patent No.: | US 8,260,289 B2 |
|---|---|---|---|
| | Fried et al. | (45) Date of Patent: | Sep. 4, 2012 |

(54) DYNAMIC USER-TO-USER ADDRESS BOOK SHARING IN A MOBILE STATION

(75) Inventors: Eric P. Fried, Austin, TX (US); Vijayasekhar Mekala, Andhra Pradesh (IN); Rajeev Mishra, Karnataka (IN); Suresh Sabarathinam, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1118 days.

(21) Appl. No.: 12/137,082

(22) Filed: Jun. 11, 2008

(65) Prior Publication Data

US 2009/0311997 A1    Dec. 17, 2009

(51) Int. Cl.
*G06F 15/16* (2006.01)
(52) U.S. Cl. .................................. 455/432.3; 455/435.1
(58) Field of Classification Search ............... 455/412.1, 455/412.2, 413, 414.1, 415, 432.3, 435.1
See application file for complete search history.

(56) References Cited

U.S. PATENT DOCUMENTS

| 6,005,927 | A | * | 12/1999 | Rahrer et al. | ............ | 379/142.01 |
|---|---|---|---|---|---|---|
| 7,206,809 | B2 | | 4/2007 | Ludwig et al. | | |
| 7,216,117 | B2 | | 5/2007 | Smith | | |
| 7,266,594 | B2 | | 9/2007 | Kumbalimutt et al. | | |
| 7,337,448 | B1 | | 2/2008 | Dalia et al. | | |
| 2006/0168344 | A1 | | 7/2006 | Tsuchiya | | |
| 2007/0038720 | A1 | | 2/2007 | Reding et al. | | |
| 2007/0207785 | A1 | * | 9/2007 | Chatterjee et al. | ......... | 455/414.1 |

* cited by examiner

*Primary Examiner* — Sam Bhattacharya
(74) *Attorney, Agent, or Firm* — Robert C. Rolnik; David A. Mims (57) ABSTRACT

The present invention provides a mobile station implemented method for managing a requested name and phone record. The method comprises steps of the requester associated device receiving a user's identification from a mobile station phonebook owner and a search term. The requester associated device transmits the user identification of the mobile station phonebook owner and the search term. Receiving at least one matching name and phone record, the requester associated device presents the at least one matching name and phone record to a user. The requester associated device receives a user management command to perform an action on the name and phone record. The method may complete when the requester associated device performs the action on the name and phone record.

18 Claims, 5 Drawing Sheets

DYNAMIC USER-TO-USER ADDRESS BOOK SHARING IN A MOBILE STATION

BACKGROUND OF THE INVENTION

1. Field of the Invention

The present invention relates generally to a computer implemented method, data processing system, and computer program product for retrieving information from a database. More specifically, the present invention relates to queries formed and transmitted to a wireless device supporting a phonebook.

2. Description of the Related Art

Wireless device makers have supported storing name and phone records to wireless devices in order to aid a user in recalling the telephone number associated with an associate's land-line phone, pager, and fax machine, among other devices. A mobile station phonebook is a set of one or more entries of name and phone records available on a mobile station. The entries may be stored to non-volatile memory such as, for example, flash memory. A mobile station may communicate with a cellular infrastructure or a Wi-Fi network, among others, to call associates listed in the mobile station phonebook. Wi-Fi is a term encompassing Institute for Electrical and Electronics Engineers (IEEE) 802.11 standard, and related wireless standards.

Acquiring an entry can be time consuming. Users acquire such name/number associations by various ways. For example, initially, a user of a device, such as a mobile station, inquires to an associate asking what the associate's numbers are. A user is a person that owns or controls a device capable of storing a name and phone record. The user transcribes the number or numbers, and then adds the name of the associate. Sometimes, the user uses a 12-key alpha-numeric keypad to select letters of the associate's name. Accordingly, the entry of a typical person's first and last names, or business's name, as well as a single telephone number can require over 40 keystrokes, if the user enters such characters correctly.

Accordingly, it may be beneficial to request a name and phone record by transmitting a name or even part of a name to an associate that has a complete name and phone record. Moreover, it may be beneficial to receive the name and phone record without too much trouble from the associate.

SUMMARY OF THE INVENTION

The present invention provides a mobile station implemented method for managing a requested name and phone record. The method comprises steps of the requester associated device receiving a user's identification from a mobile station phonebook owner and a search term. The requester associated device transmits the user identification of the mobile station phonebook owner and the search term. Receiving at least one matching name and phone record, the requester associated device presents the at least one matching name and phone record to a user. The requester associated device receives a user management command to perform an action on the name and phone record. The method may complete when the requester associated device performs the action on the name and phone record.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
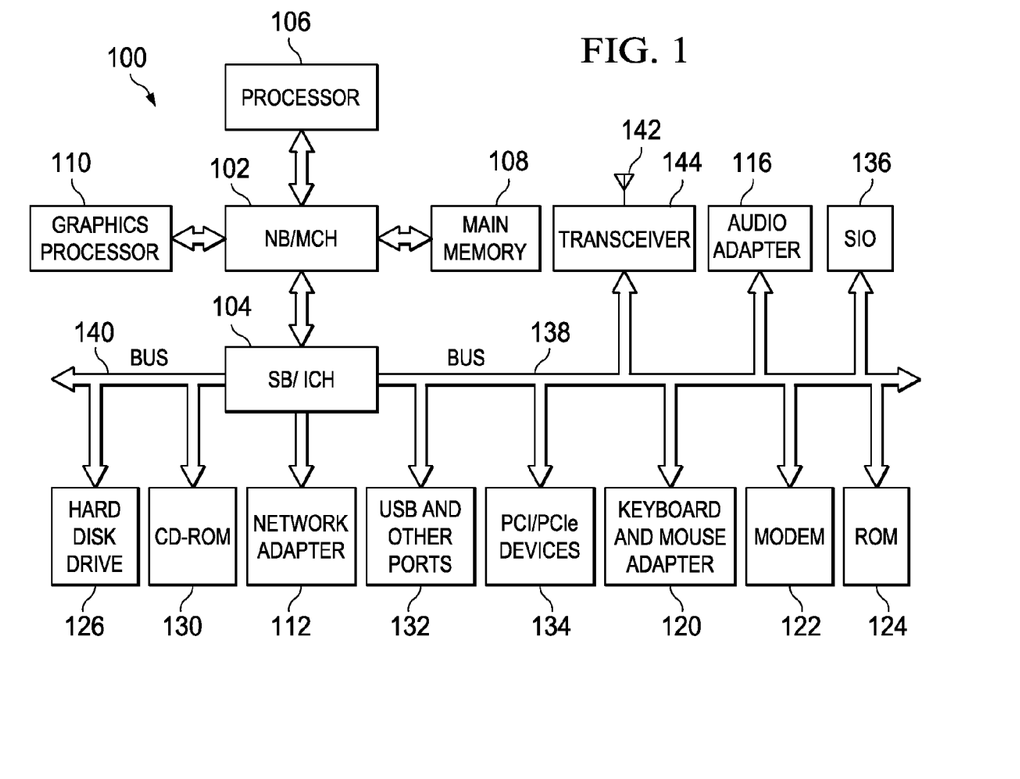
FIG. 1 is a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. Additional connectivity may be available through a transceiver 144, which establishes wireless connectivity via antenna 142 to data networks and/or cellular infrastructure. Wireless connectivity may be based on, for example, Bluetooth® wireless protocol, cellular standards, or Institute of Electrical and Electronic Engineers (IEEE) 802 series standards, among others. Bluetooth is a trademark of the Bluetooth SIG. ROM 124 may be, for example, a flash binary input/output system (BIOS).

ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106 and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module", or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The aspects of the illustrative embodiments provide a computer implemented method, data processing system, and computer program product for locating and retrieving name and phone records from a wireless device. Moreover, an owner of the wireless device can pre-authorize a requester to access all non-private names and phone records in the owner's phonebook.

Figure 2:
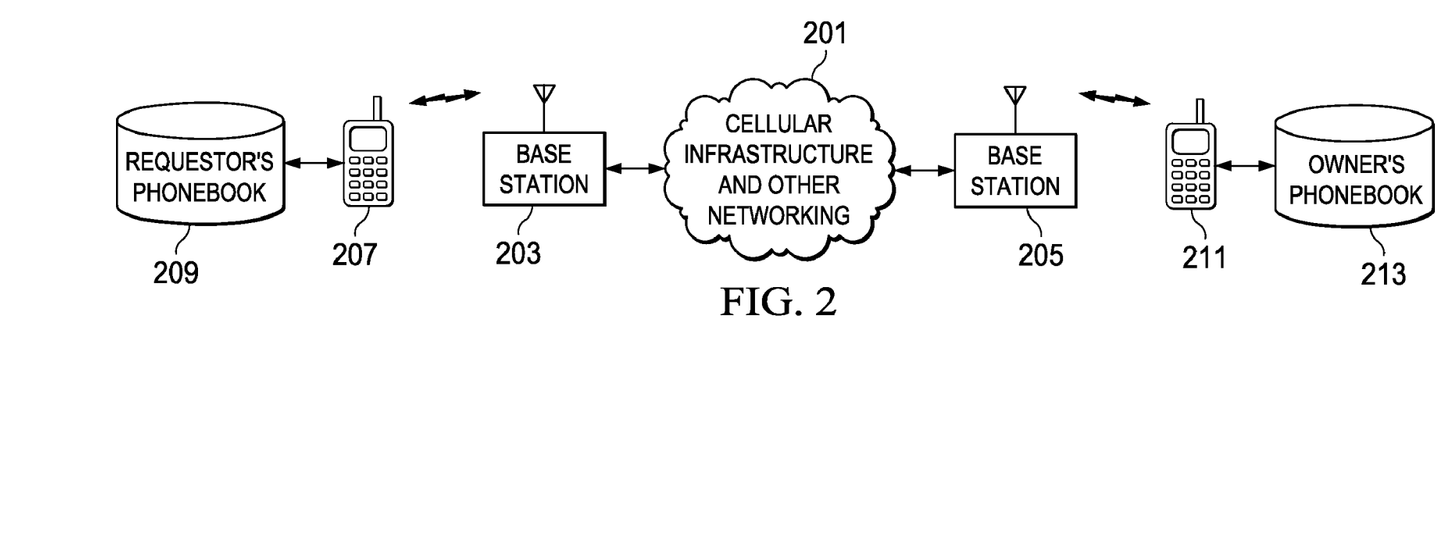
FIG. 2 is a cellular infrastructure in accordance with an illustrative embodiment of the invention.

FIG. 2 is a cellular infrastructure in accordance with an illustrative embodiment of the invention. Cellular infrastructure is one or more cellular base stations, switches, trunks, access points and/or other supporting equipment that permits at least one leg, or segment, of a telephone call to be transmitted wirelessly. Such cellular infrastructure may include packet networks and microwave links, among other interconnecting devices. Cellular infrastructure 201 interconnects base station 203 with base station 205. Base station 203 and base station 205 can be two of many base stations that may operate over a city, state, country or region. A base station is one or more transceivers equipped to transmit and receive pages, call-setup traffic, voice traffic and other telephony signals transmitted over the air. A base station is, for example, a cellular base station, an access point, or any other transceiver and on-site supporting equipment.

Cellular infrastructure and associated base stations may permit mobile stations to access various telephony and paging functions, depending on the service plan to which a user subscribes. The user owns or otherwise controls a mobile station. FIG. 2 depicts two mobile stations. A mobile station is a wireless device that operates with a cellular infrastructure or other wireless equipment such that handoffs or handovers may occur as a mobile station leaves one region of coverage and enters a second region of coverage.

A requester uses a user mobile station 207. User mobile station 207 stores requester's phonebook 209. Requester's phonebook 209 is a user's mobile station phonebook. The requester's phonebook is called as such since for purposes of an example phone record request, requester's phonebook 209 plays the role of a device that requests information from a second device. A requester associated device is a device of a requester that can store name and phone records in non-volatile memory. The requester associated device can be, for example, a mobile station, a two-way pager, a data processing system, among others.

In contrast, owner's mobile station 211 is called as such since for purposes of an example phone record request, owner's mobile station 211 is the target of a request for information. Owner's phonebook 213, accordingly, contains name and phone records of the owner. A mobile station phonebook owner is an owner, lessee, or other routine user of a mobile station. A user mobile station is a mobile station of the user. Mobile station 207 and mobile station 211 may be instances of a data processing system, such as, for example, data processing system 100 of FIG. 1.

It is appreciated that the roles of the requester and the owner may be reversed depending on who is requesting information from what device.

A user mobile station phonebook is a mobile station phonebook stored within a mobile station of the user. Similarly, an owner's mobile station phonebook is a mobile station phonebook stored within a mobile station associated with an owner.

Figure 3:
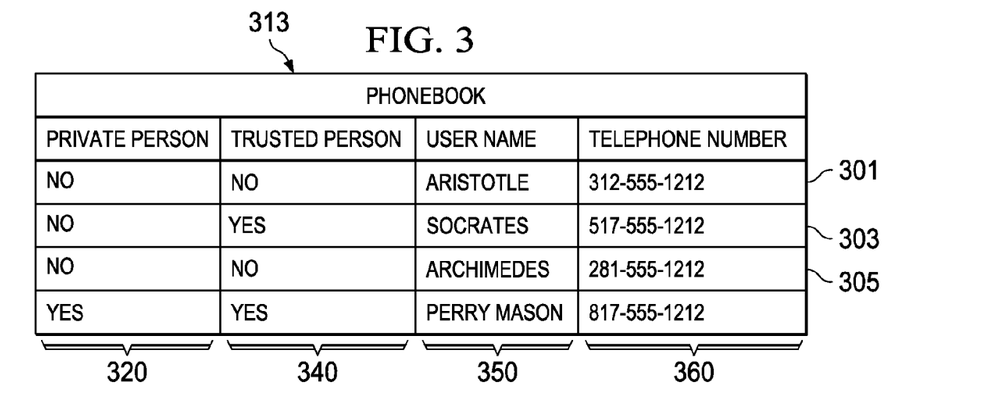
FIG. 3 is a phonebook in accordance with an illustrative embodiment of the invention.

FIG. 3 is a phonebook in accordance with an illustrative embodiment of the invention. Phonebook 313 can be a mobile station phonebook, such as, for example, owner's phonebook 213 of FIG. 2. A mobile station phonebook is a set of one or more entries of name and phone records available on a mobile station. The entries may be stored to non-volatile memory such as, for example, flash memory. Phonebook 313, as depicted here, is exemplary only. Entries shown are examples of name and phone records. Accordingly, in practice, such phone entries will vary widely depending on the associations of a user, the preferred character set used by the user, and telephone plans for telephony systems used by the user.

Phonebook 313 is shown having four entries or name and phone records. Each entry or name and phone record comprises at least a user name and a telephone number. A name and phone record is a record that can be stored to a mobile station such that a telephone number is associated with a name. If stored in non-volatile memory of the mobile station, the name and phone record becomes part of the mobile station phonebook. A name is a text string using a character set that is associated with a person, or business. Phonebook 313, though depicted as a table data structure, may be arranged in a number of alternative data structures. Such data structures can include, for example, linked lists, trees, eXtensible Markup Language (XML) files, and the like.

Names may be arranged in a name field for each name and phone record. Accordingly, phonebook 313 can be arranged to have a user name column 350. Similarly, phonebook 313 can be arranged to have a telephone number column 360. A telephone number is a series of numbers that is complete with respect to a telephone network. An example of a telephone number can be, for example, a telephone number as defined in North American Numbering Plan Administration (NANPA), or as defined by a calling plan as used in voice over IP (VOIP) networks. A telephone number can include symbols that are associated with international calling, pauses, or other telephony functions typically definable within a telephone field of a mobile station name and phone record. The telephone number can be associated with a name in a name and phone record. In addition, multiple entries of telephone numbers may exist for a person, or business, in a name and phone record. An entry of the user's mobile station phonebook is a data record of a data structure having at least a telephone number for a device that responds to calls and other communication functions addressed by the telephone number.

Accordingly, the entry can be for a facsimile machine, a mobile telephone, a pager, among others. As may be appreciated, phonebook 313 can contain any number of columns for as many telephone devices as a user may own or operate. Accordingly, phonebook 313 is merely an example of a simple data structure that provides a single entry for each name and phone record. One embodiment may implement phonebook 313 as a linked list. As such, the linked list may be expandable to any number of telephone numbers.

Additional columns may be available in a name and phone record. For example, each name and phone record may include a Boolean value used to identify if the associated person is a trusted person. Such Boolean values may be found under the trusted person column 340. Similarly, each name and phone record may include a private person value. Such a value may be found under the private person column 320. Thus, for example, name and phone record 301, associated with the person, "Aristotle", can indicate a telephone number of 312-555-1212, as well as indicate that Aristotle is not a private person, and is not a trusted person. Accordingly, methods described as embodiments of the invention may prohibit any phone record requests that originate from a device associated with Aristotle from accessing records of the owner of a phonebook based on name and phonebook record 301.

In contrast, name and phone record 303 may be associated with the person, Socrates, and accordingly, the name "Socrates" appears in the user field. Socrates may be identified as a trusted person, as depicted in FIG. 3. Consequently, illustrative embodiments of the invention may permit phone record requests from Socrates to access details of some of the name and phone records of the owner's phonebook 313. Further details in additional records, such as name and phone record 305, provide further user names coupled to telephone numbers.

Figure 4:
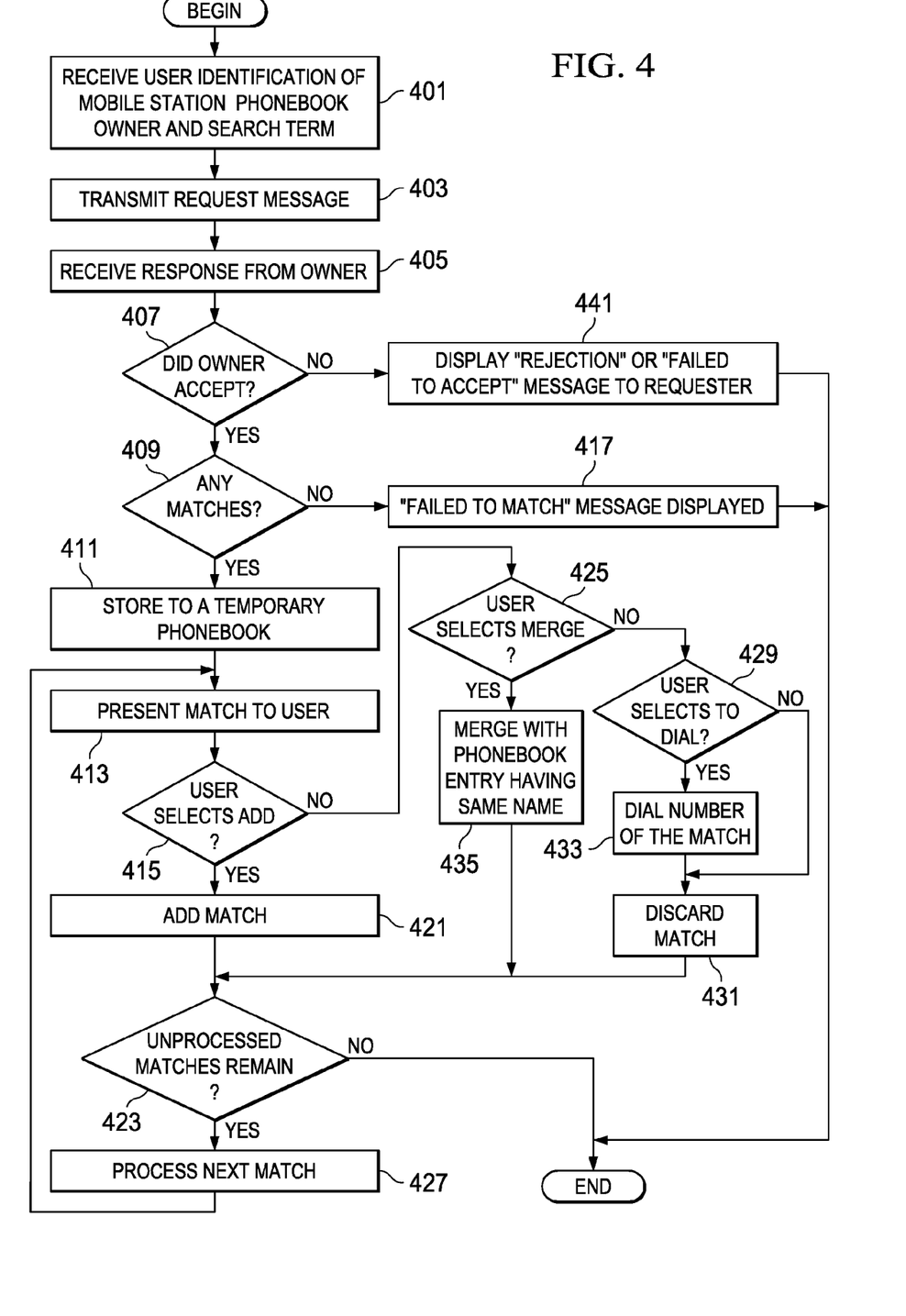
FIG. 4 is a flowchart for requesting a name and phone record from a user device in accordance with an illustrative embodiment of the invention.

FIG. 4 is a flowchart for requesting a name and phone record from a user device in accordance with an illustrative embodiment of the invention. Initially, a requester associated device may receive a user identification of a mobile station phonebook owner and a search term (step 401). The requester associated device can be a mobile station owned or controlled by a requester, for example, mobile station 207 of FIG. 2. A user identification is a selection of a telephone number associated with a mobile station. The user identification may identify a mobile station having one or more name and phone records. Next, the requester associated device may transmit the request message (step 403). The request message may be transmitted to a cellular infrastructure for eventual delivery to an owner associated mobile station.

A request message is a message associated with a telephone number of a sender or requester. The associated number is called a requester number. The request message is transmitted to and arrives at a device having name and phone records. The request message may also include a phone record request indicator. The phone record request indicator is an indicator that the requester requests a name and phone record. The indicator can be a binary encoded field that uses a predetermined number in a packet that is accepted, by convention, among mobile station device manufacturers as a distinct number to signal that the nature of the request is to obtain a name and phone record. Accordingly, the phone record request indicator may represent an ASCII or other encoding of one or more characters.

Next, the requester associated device may receive a response from the owner (step 405). The requester associated device may determine whether the owner accepted the phone record request (step 407). Such a determination may be affirmatively established if the owner accepted, and the associated message arrives to the requester associated device within a reasonable time. Accordingly, if either the accepting message arrives too late, or the owner rejects the phone record request, a negative result is determined at step 407. In which case, requester associated device displays either a "rejection" or a "failed to accept" message to the requester (step 441). Nevertheless, in cases where a requester is listed among the 'trusted' persons in the owner's database, the requester associated device may automatically accept and accordingly respond to the requester, without direct intervention by the owner. Processing terminates thereafter.

On the other hand, a positive outcome to step 407 may cause requester associated device to determine whether any matches are in the incoming message (step 409). A match is a match of a string carried in a phone record request to the content of a name and phone record. The term "match" and "matching name and phone record" are used interchangeably with reference to the embodiments of the invention. The match can be a match of a partial string within a name portion of the name and phone record. The match can operate using wildcard and character class symbols. A match can also be with other text fields associated with the name and phone record. A match may be limited by criteria set by an owner of a phonebook. For example, the owner may set a criterion to prohibit matches on name and phone records that are marked 'private'.

A failure to find matches in the responsive message is a negative outcome to step 409. Accordingly, requester associated device may display a "failed to match" message (step 417). Processing may terminate thereafter.

A positive result at step 409 can cause the requester associated device to store the name and phone record to a temporary phonebook step 411. The temporary phonebook can be, for example, a data structure in volatile memory of a mobile station. Next, the requester associated device may present the match to the user (step 413). Such a presentation can include presenting a menu of options that provide the user a range of "user management commands" to choose from in order to further process one or more matches.

A user management command is a command to perform an action or operation on a name and phone record, including data contained therein. User management commands can be, for example, a command to add a matching name and phone record to the requester's phonebook located in the requester associated device. Another example can be a user management command to merge one or more telephone numbers in a matching name and phone record to a requester associated device. Such a presentation of a 'merge' option to a user may be dependent on the match also appearing as a person in the requester's phonebook. The requester's phonebook can be a phonebook of a requester associated device.

Consequently, the user may select an add user management command. If so, the requester associated device determines that the user selects "add" (step 415). A positive outcome results in the requester associated device adding the matching name and phone number (step 421).

A negative outcome to step 415 may result in the requester associated device determining whether the user selects "merge" (step 425). If so, the requester associated device may merge the match with the phonebook entry having an identical name as the match (step 435). An alternative embodiment may allow a match to occur upon satisfying a subset of name elements in a name portion of a name and phone record. A name portion is the one or more names, prefixes and/or suffixes associated with a person. For example, a name such as "Theodore Roosevelt" may be a candidate for merging if a received name and phone record includes a name such as "Ted Roosevelt". Accordingly, a merge candidate may be established by having a common last name with a received name and phone record. Accordingly, an embodiment may establish a merge candidate if a last name is identical between an incumbent record and a received record. An alternative embodiment may suggest merging records only if the incumbent record and received record have common last names, as well as a common variation of a first name. Merging comprises adding additional details to a name and phone record. Merging does not include overwriting information in the name and phone record.

Otherwise, the requester associated device may determine if the user selects a dial user management command (step 429). A positive outcome to step 429 may result in the requester associated device dialing a number of the match (step 433). Step 433 may be executed by making a call attempt using the number. A call attempt is a wireless transmission from a telephony device that is directed to a telephone number. Such a call attempt may use cellular infrastructure to locate, connect, and carry the call, contemporaneously with the call being completed. Such a call attempt can terminate in a variety of ways. For example, the call can terminate with a centralized voice mail service. As a further example, other telephony equipment may forward the call to an alternate telephone. However, a negative outcome to step 429 may result in the requester associated device discarding the match (step 431).

Steps 421, 431 and 433 and 435 are actions. An action is a data processing function or a communication function performed on or based upon a telephone number. The action can also be a step, or computer program code to perform a function on associated data of the telephone number, such as, for example, a name. Following steps 421, 431 and/or 435, the requester associated device may determine if unprocessed matches remain (step 423). If further unprocessed matches exist, the requester associated device may process a next match (step 427). Further unprocessed matches may exist if the matches have not been associated with a user management command. Accordingly, the next match is presented to a user at step 413. Otherwise, processing terminates thereafter.

Figure 5:
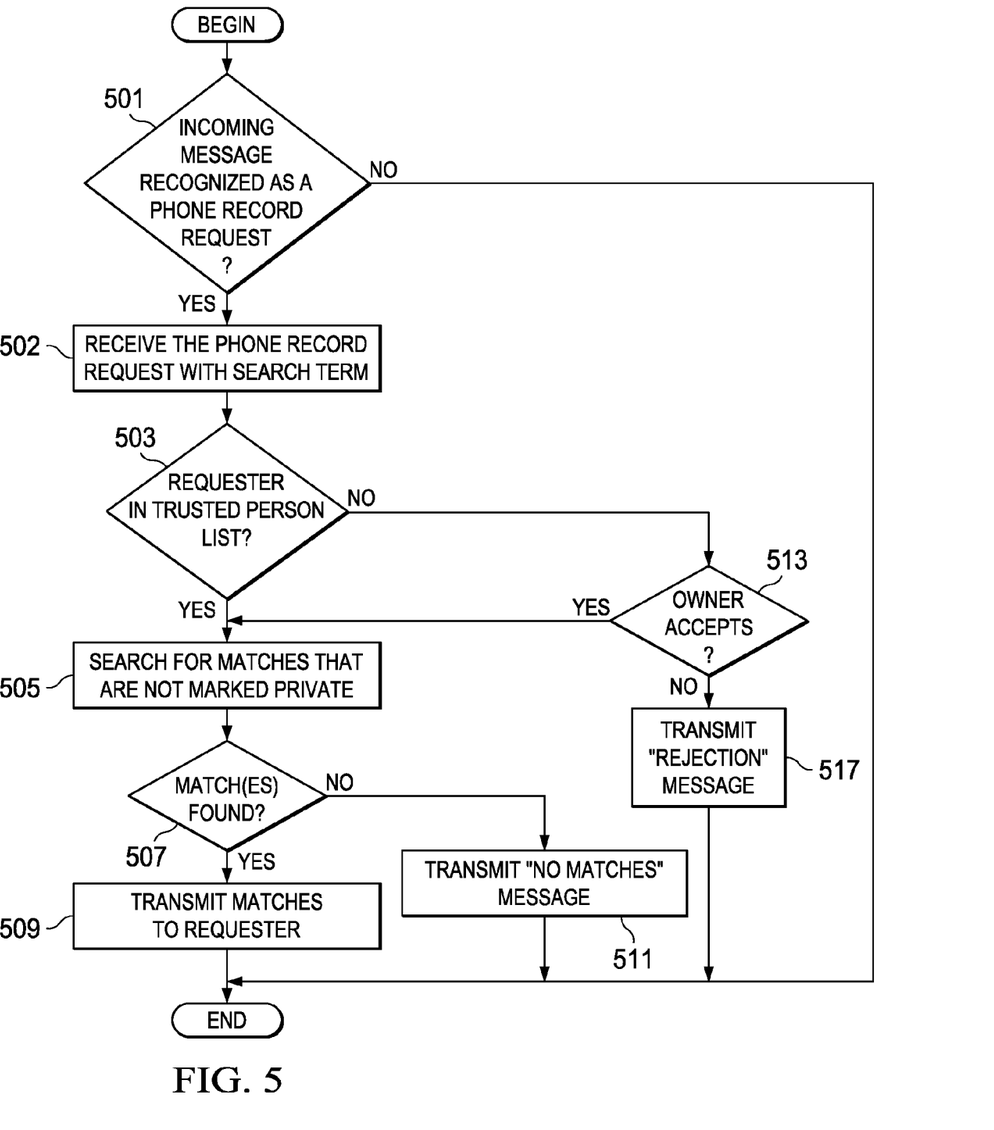
FIG. 5 is a flowchart for handling a request for a name and phone record in accordance with an illustrative embodiment of the invention.

FIG. 5 is a flowchart for handling a request for a name and phone record in accordance with an illustrative embodiment of the invention. Initially, a mobile station determines if an incoming message is a phone record request (step 501). If the determination is that the incoming message is not a phone record request, processing terminates thereafter.

If the determination is that the incoming message is a phone record request, the mobile station receives the phone record request with a search term (step 502). A phone record request includes a phone request indicator. The phone record request includes a requester phone number.

A requester is the person that is associated with a device that transmits a telephone call or text message that comprises a phone record request. A requester number is a number presented during a telephone call or during a text message that identifies a device that is the source of the telephone call or text message. A text message is a message transmitted wirelessly that bears at least a requester number.

Next, the mobile station may determine if the requester is in a trusted person list (step 503). The trusted person list may be a sequence of name and phone records that associate a name and/or a telephone number to an indicator that the telephone number belongs to a trusted person. Such an indicator can be found within an owner's phonebook 313, for example, trusted person column 340 of FIG. 3. If the requester is not in the trusted person list, an owner may be presented with an option to, nevertheless, accept the phone record request. Such a presentation may include the requester number, the requester name, or both to the owner. In addition, the presentation may present choices of "yes" and "no" to a user, with a phrase such as, "Aristotle requests phonebook matches to Archimedes".

The mobile station determines whether the owner of the mobile station accepts (step 513). If the owner does not accept, the mobile station may transmit a "rejection" message (step 517). Processing terminates thereafter.

On the other hand, if the owner accepts the phone record request, the mobile station may search for matches that are not marked private (step 505). Such a search can be conducted on data stored in an owner phonebook. In addition, various wildcards and character class characters in a search term may open up the scope of matches found during step 505. A search term is a string of characters that define criteria for matching name and phone records on the basis of any text field. For example, a text field can be a user name. A name search term is a string of characters that establishes some parameters concerning what name and phone records make up matching name and phone records. Accordingly, the search term can include one or more characters and wildcard characters used to define the parameters. A name is a text string using a character set that is associated with a person or business.

One form of wildcard character may be an all indication. An all indication is a signal that corresponds to a list of name and phone records. The all indication operates as a search term to indicate that for all name and phone records of a device associated with an owner, a requester requests that such name and phone records be transmitted to a requester associated device. It is appreciated that the form of search terms may be in a form that is parseable and searchable by a regular expression engine. A regular expression engine can be, for example, as used in Perl 5.0, JavaScript™, POSIX (IEEE 1003 standard), among others. JavaScript is a trademark of Sun Microsystems. Accordingly, a search term can be a criterion that describes a terms related to a person. A term related to a person is any term that can be associated with a particular person. Such terms related to a person can include a business name, a profession, or a title, among other things.

Next, the mobile station may determine if one or more matches are found (step 507). If no matches are found, the mobile station may transmit a message to the requester device that no matches are found (step 511). Processing terminates thereafter. However, if matches are found, the mobile station transmits matches to the device associated with the requester number (step 509). Where a name and phone record would match a search term but for the indication that the name and phone record is private, the mobile station may skip transmitting such a name and phone record. If the mobile station received an "all indication" from a user that is a trusted person, then the mobile station may only skip the name and phone records that are marked private. Processing terminates thereafter.

It is appreciated that the phone record request may be received at the mobile station as either a text message (concatenated or unconcatenated), or as a voice call. Alternatively, for requests made using a voice call, the phone record request indicator can be a sequence of tones in a voice call that are established by convention to indicate a request for a name and phone record. Such tones can be, for example, a sequence of dual tone multi-frequency (DTMF) tones. Accordingly, the incoming message can be comprised of the tones and/or any alphanumeric character associated with such tones. As may be appreciated, alternative encoding formats may be used. Such formats may be carried by localized wireless connections, infrared, and other electromagnetic transmissions.

Figure 6:
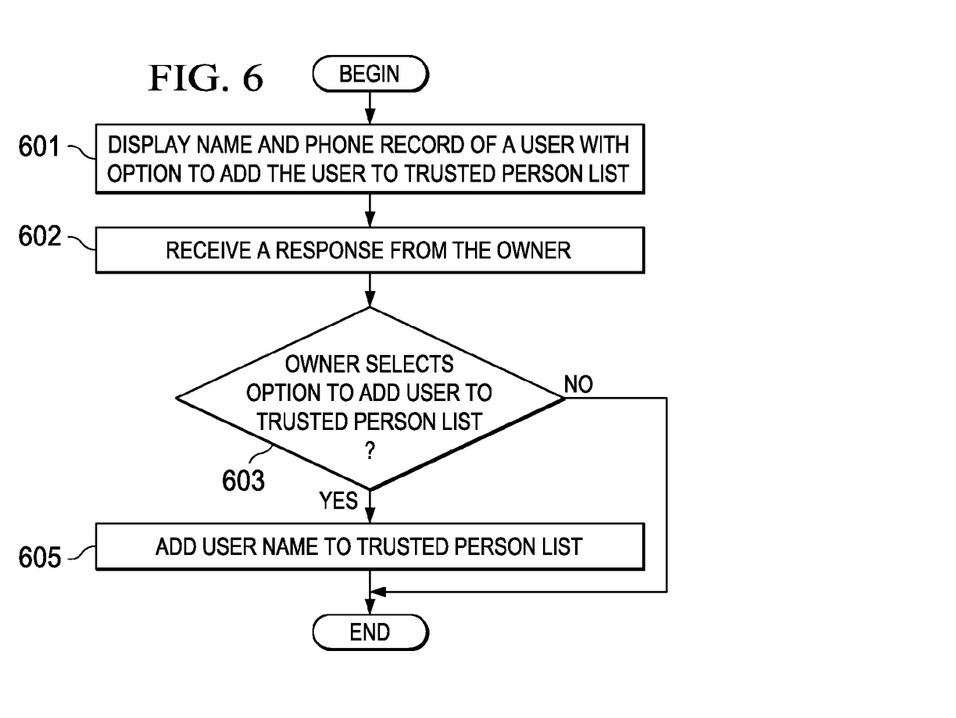
FIG. 6 is a flowchart for managing a list of one or more trusted persons in accordance with an illustrative embodiment of the invention.

FIG. 6 is a flowchart for managing a list of one or more trusted persons in accordance with an illustrative embodiment of the invention. A trusted person is a person, identified by name, that is trusted sufficiently to access at least name and phone records not marked private within an owner's phonebook. Initially, the mobile station displays a name and phone record of a user with an option to add the user to a trusted person list (step 601). Next, the mobile station may receive a response from the owner (step 602). The mobile station determines if the owner selected the option to add the user to the trusted person list (step 603). If the mobile station determined that the owner opted to add the user to the trusted person list, the mobile station adds the user name to the trusted person list (step 605). The mobile station may perform this step by toggling a Boolean value in the name and phone record corresponding to the user name to indicate, for example, "trusted". Accordingly, a Boolean value may be changed from "not trusted" to "trusted". Processing terminates thereafter, and in any event, after a negative result to step 603.

Figure 7:
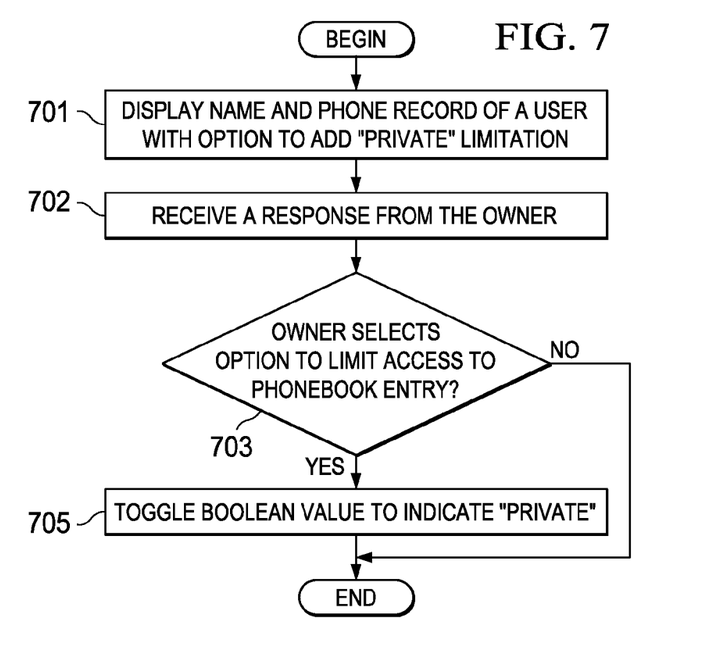
FIG. 7 is a flowchart for managing name and phonebook entries to be private in accordance with an illustrative embodiment of the invention.

FIG. 7 is a flowchart for managing name and phonebook entries to be private in accordance with an illustrative embodiment of the invention. Initially, the mobile station may display a name and phone record of a user with the option to add a "private" limitation (step 701). Next, the mobile station may receive a response from the owner (step 702). The mobile station determines whether the owner selects an option to limit access to the phonebook entry (step 703). A phonebook entry can be a name and phone record. If the owner selects the option to limit access to the name and phone record, the mobile station toggles the associated Boolean value to indicate "private" (step 705). Processing terminates thereafter. It is appreciated that the alternate form of the Boolean value is "not private". Accordingly, a similar method may toggle the Boolean value to transition from "private" to "not private".

Further embodiments may permit more fine-grained adjustments to indicate varying levels of trust. For example, a trust setting may be set to among four values, which may permit to an acquaintance to transition from mere acquaintance to a trusted confidant. Accordingly, a 'level 1' trust status may indicate that the requester is permitted automatic access to all name phone records, including those marked private. A 'level 2' trust status may indicate that the requester is automatically permitted to see all entries not marked private. A 'level 3' trust status may indicate that the requester is permitted to retrieve entries, as described for 'level 2', however, only with the manual acknowledgment or permission of the owner. Still further, 'level 4' may be treated as described above, in relation to, "not trusted".

The illustrative embodiments permit a user to query an associate's mobile station for contact details, and receive automatically any matches to a search term the user used to form the query. Similarly, an owner of a phonebook may restrict automatic access to name and phone records by either excluding a user and/or requester from a trusted person list or by marking a particular name and phone record entry as private.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A mobile station implemented method for managing a requested name and phone record, the method comprising:

receiving a user identification of a mobile station phonebook owner and a search term;

transmitting the user identification of the mobile station phonebook owner and the search term;
receiving at least one matching name and phone record;
presenting the at least one matching name and phone record to a user;
receiving a user management command to perform an action on the name and phone record; and
performing the action on the name and phone record, wherein performing the action further comprises adding the matching name and phone record to a user mobile station phonebook stored within the user mobile station, wherein the action is to add a match and receiving comprises receiving the user identification at the user mobile station.

2. The mobile station implemented method of claim 1, wherein the search term is a term related to a person.

3. The mobile station implemented method of claim 1, further comprising:
transmitting a call attempt to a cellular infrastructure using a telephone number of the name and phone record; and
responsive to transmitting the call attempt, discarding the matching name and phone record, wherein the action is to dial the telephone number.

4. The mobile station implemented method of claim 1, wherein the search term is not a telephone number.

5. The mobile station implemented method of claim 1, further comprising:
receiving a second matching name and phone record;
presenting the second matching name and phone record to the user;
receiving a second user management command; and
performing a second action on the second name and phone record, wherein the search term is an all indication.

6. The mobile station implemented method of claim 1, further comprising:
merging at least one telephone number from the at least one name and phone record to an entry of the user's mobile station phonebook, wherein the action is to merge the at least one telephone number.

7. A mobile station implemented method to transmit a name and phone record of an owner's mobile station phonebook, the method comprising:
receiving from a requester associated device a request message having a name and phone record request indicator and a requester number;
receiving a search term associated with the request message;
determining that the requester number is in a name and phone record of the owner marked as trusted;
responsive to a determination that the requester number is in the name and phone record of the owner marked as trusted, searching for at least one name and phone record in the owner's mobile station phonebook based on the search term;
determining that at least one name and phone record matches the search term;
determining that the at least one name and phone record is not marked private; and
responsive to a determination that the at least one name and phone record is not marked private, transmitting the at least one name and phone record to the requester associated device.

8. The mobile station implemented method of claim 7, further comprising:
presenting the requester name to the owner; and
receiving an indication from the owner that a requester associated with the requester name is a trusted person.

9. The mobile station implemented method of claim 7, further comprising:
adding the at least one name and phone record to the owner's mobile station phonebook as a name and phone record that is not marked private.

10. The mobile station implemented method of claim 7, wherein transmitting the at least one name and phone record comprises transmitting at least one text message having a name and a telephone number to the requester associated device.

11. The mobile station implemented method of claim 7, wherein the requester associated device is a mobile station.

12. The mobile station implemented method of claim 7, further comprising:
determining that at least one second name and phone record is marked private; and
responsive to the determining that at least one second name and phone record is marked private, skipping transmitting the second name and phone record.

13. A computer program product for managing a requested name and phone record, the computer program product comprising:
a computer usable medium having computer usable program code embodied therewith, the computer program product comprising:
computer usable program code for receiving a user identification of a mobile station phonebook owner and a search term;
computer usable program code for transmitting the user identification of the mobile station phonebook owner and the search term;
computer usable program code for receiving at least one matching name and phone record;
computer usable program code for presenting the at least one matching name and phone record to a user;
computer usable program code for receiving a user management command to perform an action on the name and phone record; and
computer usable program code for performing the action on the name and phone record, wherein computer usable program code for performing the action comprises computer usable program code for adding the matching name and phone record to a user mobile station phonebook stored within a user mobile station, wherein the action is to add a match and receiving comprises receiving the user identification at the user mobile station.

14. The computer program product of claim 13, wherein the search term is a term related to a person.

15. The computer program product of claim 13, further comprising:
computer usable program code for transmitting a call attempt to a cellular infrastructure using a telephone number of the name and phone record; and
computer usable program code for responsive to transmitting the call attempt, discarding the matching name and phone record, wherein the action is to dial the telephone number.

16. The computer program product of claim 13, wherein the search term is not a telephone number.

17. The computer program product of claim 13, further comprising:
computer usable program code for receiving a second matching name and phone record;
computer usable program code for presenting the second matching name and phone record to the user;
computer usable program code for receiving a second user management command; and computer usable program code for performing the second action on the second name and phone record, wherein the search term is an all indication.

18. The computer program product of claim 13, further comprising:

computer usable program code for merging at least one telephone number from the at least one name and phone record to an entry of the user's mobile station phonebook, wherein the action is to merge the at least one telephone number.

* * * * *